(12) United States Patent
Palczewski et al.

(10) Patent No.: US 11,711,558 B2
(45) Date of Patent: Jul. 25, 2023

(54) USER CLASSIFICATION BASED ON USER CONTENT VIEWED

(71) Applicant: Samsung Electronics Company, Ltd., Suwon si (KR)

(72) Inventors: Tomasz Jan Palczewski, Danville, CA (US); Praveen Pratury, Mountain House, CA (US); Hyun Chul Lee, Mountain View, CA (US); Hyun-Woo Kim, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 304 days.

(21) Appl. No.: 16/985,161

(22) Filed: Aug. 4, 2020

(65) Prior Publication Data

US 2022/0046301 A1    Feb. 10, 2022

(51) Int. Cl.
*G06N 3/049* (2023.01)
*G06N 3/048* (2023.01)
*H04N 21/25* (2011.01)

(52) U.S. Cl.
CPC ........... *H04N 21/251* (2013.01); *G06N 3/048* (2023.01); *G06N 3/049* (2013.01)

(58) Field of Classification Search
CPC ..... H04N 21/251; G06N 3/0481; G06N 3/049
USPC .......................................................... 706/12
See application file for complete search history.

(56) References Cited

U.S. PATENT DOCUMENTS 8,924,993 B1 * 12/2014 Niebles Duque ............
H04N 21/23418
725/9

| 10,469,275 | B1 | 11/2019 | Broomall |
| 2016/0066041 | A1 | 3/2016 | Fei |
| 2016/0260135 | A1 | 9/2016 | Zomet |
| 2017/0064358 | A1 | 3/2017 | Sullivan |
| 2017/0161772 | A1 | 6/2017 | Xu |
| 2018/0376220 | A1 | 12/2018 | Ray |

(Continued)

OTHER PUBLICATIONS

Ha, Jung-Woo, et al., "Large-Scale Item Categorization in e-Commerce Using Multiple Recurrent Neural Networks," KDD'16, Aug. 13-17, 2016, San Francisco, CA, © 2016 ACM, ISBN 978-1-4503-4232-2/16/08, DOI: htpp://dx.doi.org/10.1145/2939672.2939678., 9 pages, Aug. 13, 2016.

(Continued)

*Primary Examiner* — Omar F Fernandez Rivas
*Assistant Examiner* — Chaitanya R Jayakumar (57) ABSTRACT

A method implemented by one or more computing systems includes accessing content viewing data associated with a first user account, wherein the first user account is associated with one or more client devices. The content viewing data includes temporal-based content viewing data. The method further includes determining, using one or more sequence models, a set of content viewing features based on the temporal-based content viewing data, and concatenating the content viewing features into a single computational array. The method further includes providing, through one or more dense layers of a deep-learning model, the single computational array to an output layer of the deep-learning model, and calculating, based on the output layer, one or more probabilities for one or more labels for the first user account. Each label includes a predicted attribute for the first user account.

20 Claims, 6 Drawing Sheets

(56) References Cited

U.S. PATENT DOCUMENTS

| | | |
|---|---|---|
| 2019/0156366 A1 | 5/2019 | Wilson |
| 2019/0173312 A1 | 6/2019 | Kumar |
| 2019/0295004 A1 | 9/2019 | Chaturapruek |
| 2020/0126100 A1 | 4/2020 | Goyal |
| 2020/0202194 A1* | 6/2020 | Wu .................. G06N 3/004 |
| 2021/0035141 A1* | 2/2021 | Das .................. G06N 3/0472 |
| 2021/0141867 A1* | 5/2021 | Wason ............... G06N 3/0454 |

OTHER PUBLICATIONS

Nabi, Javaid, Machine Learning—Multiclass Classification with Imbalanced Datasets, https://towardsdatascience.com/machine-learning-multiclass-classification-with-imbalance, 14 pages, Dec. 22, 2018.

International Search Report and Written Opinion for International Application No. PCT/KR2021/001561, dated May 24, 2021.

Zhabiz Gharibshah et al., "Deep Learning for User Interest and Response Prediction in Online Display Advertising", Data Sci. Eng. 5, pp. 12-26, Jan. 17, 2020, [retrieved on May 7, 2021], Retrieved from the Internet: <URL: https://doi.org/10.1007/s41019-019-00115-y> pp. 12-21, Jan. 17, 2020.

* cited by examiner

USER CLASSIFICATION BASED ON USER CONTENT VIEWED

TECHNICAL FIELD

This disclosure relates generally to user classifications, and, more particularly, to classifications based on user content viewed.

BACKGROUND

Television (TV) broadcasting and streaming services typically include applications that facilitate users in locating items of interest for consumption, often in a quasi-personalized manner. For example, the TV broadcasting and streaming services may include applications that facilitate users in locating certain movies, TV series, news programs, sporting telecasts, and so forth that one or more particular user may be interested in viewing. Most generally, such applications may rely solely upon the viewing history of the one or more particular users, but may not know any personal information of the one or more particular users. Thus, such applications often struggle to provide content and/or content recommendations that are particularly suited to, for example, the desires, preferences, and interests of the one or more particular users.

DESCRIPTION OF EXAMPLE EMBODIMENTS

The present embodiments are directed toward a programming analytics system for predicting user demographics classifications based on user viewing content data. The programming analytics system may access content viewing data associated with a first user account, in which the first user account is associated with one or more client devices and the content viewing data comprises temporal-based content viewing data. In particular embodiments, the temporal-based content viewing data may include content programming genre data. The programming analytics system determine, using one or more sequence models, a set of content viewing features based on the temporal-based content viewing data. In particular embodiments, the set of content viewing features may include a set of long-short-term memory (LSTM) layers each corresponding to a different one of a number of temporal-based content programming genres or temporal-based content programming subgenres. Specifically, the set of content viewing features may be determined at least in part based on the content programming genre data.

In particular embodiments, the programming analytics system may concatenate the content viewing features into a single computational array. The analytics system may provide, through one or more dense layers of a deep-learning model, the single computational array to an output layer of the deep-learning model. In particular embodiments, the programming analytics system may then calculate, based on the output layer, one or more probabilities for one or more labels for the first user account, in which each label includes a predicted attribute for the first user account. In particular embodiments, calculating, based on the output of the output layer, one or more probabilities for the one or more labels may include calculating one or more of an N number of combinations of an M number of demographic parameters. The demographic parameters may include, for example, a number of user age groups and a number of user genders. In particular embodiments, the output layer may include a sigmoid output layer of the deep-learning model. In particular embodiments, the deep learning model may also include, for example, a weighted-binary cross entropy loss function, a binary cross entropy loss function, or a focal loss (FL) loss function.

Indeed, in some implementations, the present embodiments of predicting user demographics classifications based on user viewing content data may provide an increasingly accurate prediction of up to 14 individual demographic classification labels corresponding to multi-label associations between user age group and user gender (e.g., F:13-17, M:13-17, F:18-24, M:18-24, F:25-34, M:25-34, F:35-44, M:35-44, F:45-54, M:45-54, F:55-64, M:55-64, F:65+, M:65+). In this way, the present embodiments may allow the programming analytics system 102 to provide both advertising content and programming content that may be better suited to, for example, the desires, preferences, and interests of individual users and/or individual subgroups of users. In some embodiments, the disclosed technology can provide an accurate prediction for any suitable number of individual demographic classification labels (e.g., 14, more than 14, or less than 14, etc.).

Figure 1:
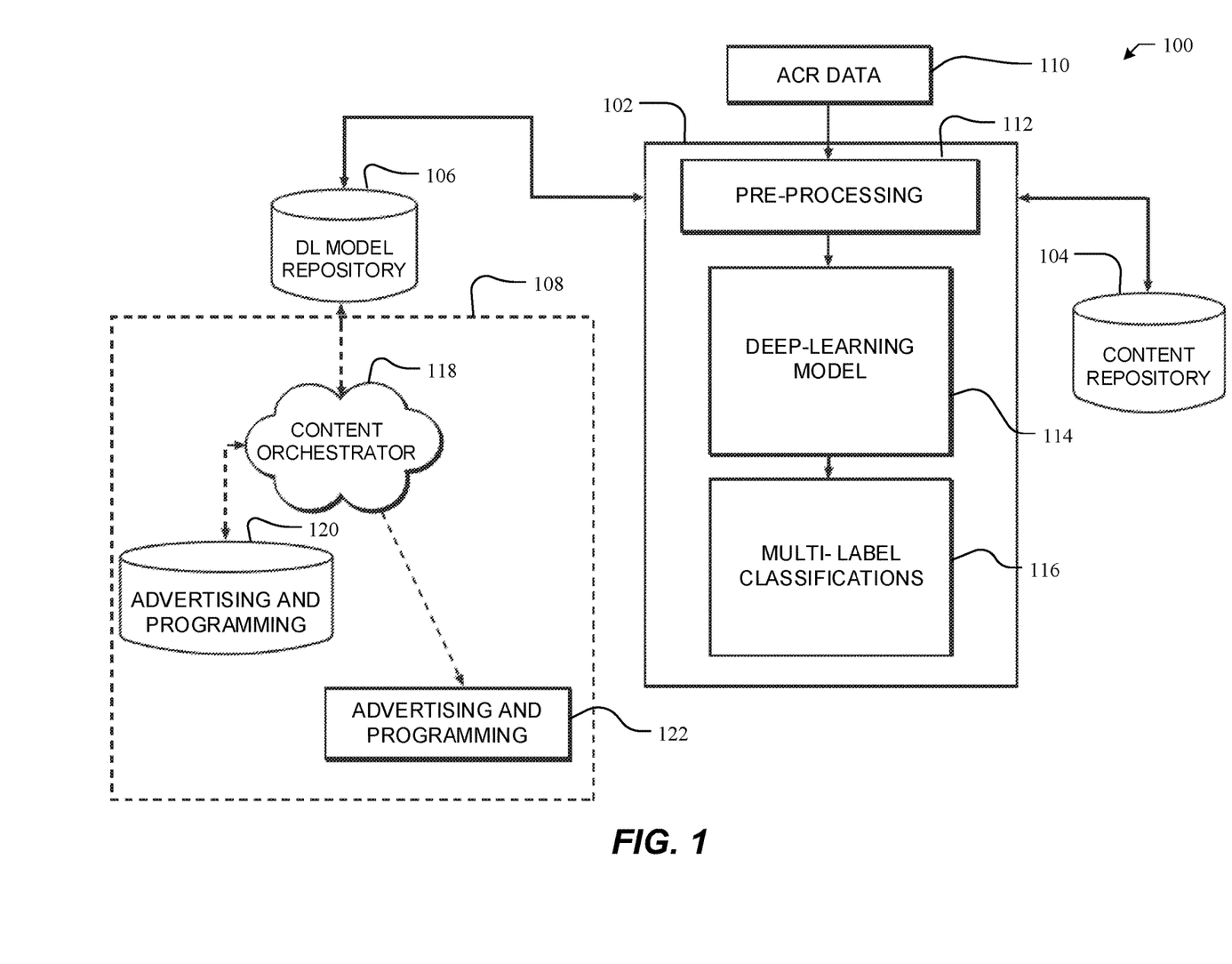
FIG. 1 illustrates an example multi-label demographics classification prediction system.

An example multi-label demographics classification prediction system 100 is illustrated by FIG. 1. As depicted by FIG. 1, the multi-label demographics classification prediction system 100 may include a programming analytics system 102, one or more databases 104, 106, and a TV programming and advertising content subnetwork 108. In particular embodiments, the programming analytics system 102 may include a cloud-based cluster computing architecture or other similar computing architecture that may receive one or more user automatic content recognition (ACR) user viewing data 110, which may be provided by first-party or third-party sources, and provide TV programming content and advertising content to one or more client devices (e.g., a TV, a standalone monitor, a desktop computer, a laptop computer, a tablet computer, a mobile phone, a wearable electronic device, a voice-controlled personal assistant device, an automotive display, a gaming system, an appliance, or other similar multimedia electronic device) suitable for displaying programming and advertising content and/or playing back programming and advertising content. Additionally, the programming analytics system 102 may be utilized to process and manage various analytics and/or data intelligence such as TV programming analytics, web analytics, user profile data, user payment data, user privacy preferences, and so forth. For example, in particular embodiments, the programming analytics system 102 may include a Platform as a Service (PaaS) architecture, a Software as a Service (SaaS) architecture, and an Infrastructure as a Service (IaaS), or other various cloud-based cluster computing architectures.

In particular embodiments, as further depicted by FIG. 1, the programming analytics system 102 may include a pre-processing functional block 112, a deep-learning model functional block 114, and multi-label classification functional block 116. In particular embodiments, the pre-processing functional block 112, the deep-learning model functional block 114, and the multi-label classification functional block 116 may each include, for example, a computing engine. In particular embodiments, the pre-processing functional block 112 may receive the ACR user viewing data 110, which may include, for example, specific programming content (e.g., TV programming) recently viewed by one or more particular users or subgroups of users. For example, the ACR user viewing data 110 may include an identification of the recently viewed programming content (e.g., TV programs), metadata associated with the recently viewed programming content (e.g., TV programs), the particular timeslot (e.g., day-hour) the recently viewed programming content (e.g., TV programs) was viewed within, and the programming channel on which the programming content (e.g., TV programs) was viewed.

In particular embodiments, the pre-processing functional block 112 may then interface with the content database 104 to associate the recently viewed programming content included in the ACR user viewing data 110 with TV programming content stored by the database 104. For example, the TV programming content stored by the database 104 may include, for example, user or subgroup profile data, programming genre data, programing category data, programming clustering category group data, or other TV programming content or metadata that may be stored by the database 104. In particular embodiments, the ACR user viewing data 110 may include time-series data expressed in an hour context and/or day context. For instance, in a particular embodiment, time-series ACR user viewing data 110 may be received, for example, every 2-hour timeslot per 24-hour time period (12 timeslots total per 24-hour day). In some embodiments, different timeslots may be utilized (e.g., 8 3-hour timeslots per 24-hour time period, 24 1-hour timeslots per 24-hour time period, 48 30-minute timeslots per 24-hour time period, etc.) In particular embodiments, the pre-processing functional block 112 may also perform stratified sampling and data augmentation on the time-series based ACR user viewing data 110 to, for example, augment and up-sample minority classes (e.g., defined as user subgroups with less than 20 examples per unique class). In particular embodiments, the data augmentation may be based on the introduction of Gaussian noise via one or more multiplicative factors.

In particular embodiments, recognizing that demographic classification is a multi-label classification problem with highly unbalanced classes, the pre-processing functional block 112 may also be utilized, for example, to split the time-series based ACR user viewing data 110 in an N number of datasets before providing to the deep-learning model functional block 114 for training, cross-validating, and testing. Thus, in particular embodiments, the pre-processing functional block 112 may perform the stratified multi-label sampling by, for example, accounting for the existence of one or more disjoint groups within a population and generating samples where the proportion of these groups is maintained. In particular embodiments, in a final pre-processing of the time-series based ACR user viewing data 110 before providing an output to the deep-learning model functional block 114 for training, cross-validating, and testing, the pre-processing functional block 112 may perform a multi-label Synthetic Minority Over-sampling Technique (SMOTE) on the time-series based ACR user viewing training dataset.

In particular embodiments, a final pre-processing of the time-series based ACR user viewing data 110 may be performed before providing an output to the deep-learning model functional block 114 for training, cross-validating, and testing. For example, in particular embodiments, the deep-learning model functional block 114 may receive an N number of datasets (e.g., N arrays of time-series based ACR user viewing data 110 in 2-hour timeslots) generate an N number of long short term (LSTM) layers based thereon. In particular embodiments, outputs of the LSTM layers of the deep-learning model functional block 114 may be combined into a single array utilizing, for example, a concatenation layer of the deep-learning model functional block 114. From the concatenation layer, the deep-learning model functional block 114 may then transfer the single array through one or more dense layers of the deep-learning model functional block 114.

In particular embodiments, from the one or more dense layers, the deep-learning model functional block 114 may then transfer the single array through a sigmoid output layer of the deep-learning model functional block 114. In particular embodiments, the sigmoid output layer of the deep-learning model functional block 114 may include, for example, a number of neurons (e.g., the number of neurons may be equal to the number of classes and/or classification labels) that may be utilized to classify the single array into individual classes, in which one or more final probabilities for individual demographic classification labels may be calculated. In particular embodiments, the deep-learning model functional block 114 may also include a loss function that may be utilized to assign a higher weight to positive classification for individual demographic classification labels, assuming that individual users and/or subgroups of users may typically not exceed more than a maximum number of users (e.g., 3 users). In particular embodiments, the loss function may include, for example, a weighted-binary cross entropy loss function, a binary cross entropy loss function, or a focal loss (FL) loss function. In particular embodiments, the deep-learning model functional block 114 may then provide predictions of the individual demographic classification labels to the multi-label classifications functional block 116 for further processing and management.

For example, as further illustrated by FIG. 1, the programming analytics system 102 may provide the predictions of the individual demographic classification labels to the database 106. In particular embodiments, as further depicted by FIG. 1, a network-based content orchestrator 118 may retrieve the predictions of the individual demographic classification labels from the database 106. The content orchestrator 118 may then store the predictions of the individual demographic classification labels together with TV programming and advertising content to be viewed in a programming and advertising content base 120. In particular embodiments, based on the predictions of the individual demographic classification labels, the content orchestrator 118 may then provide TV programming and advertising content 122 to, for example, an end-user client device for user viewing. Indeed, in some implementations, the present embodiments of predicting user demographics classifications based on user viewing content data may provide an increasingly accurate prediction of up to 14 individual demographic classification labels corresponding to multi-label associations between user age group and user gender (e.g., F:13-17, M:13-17, F:18-24, M:18-24, F:25-34, M:25-34, F:35-44, M:35-44, F:45-54, M:45-54, F:55-64, M:55-64, F:65+, M:65+). In this way, the present embodiments may allow the programming analytics system 102 to provide both programming and advertising content that may be better suited to, for example, the desires, preferences, and interests of individual users and/or individual subgroups of users.

Figure 2:
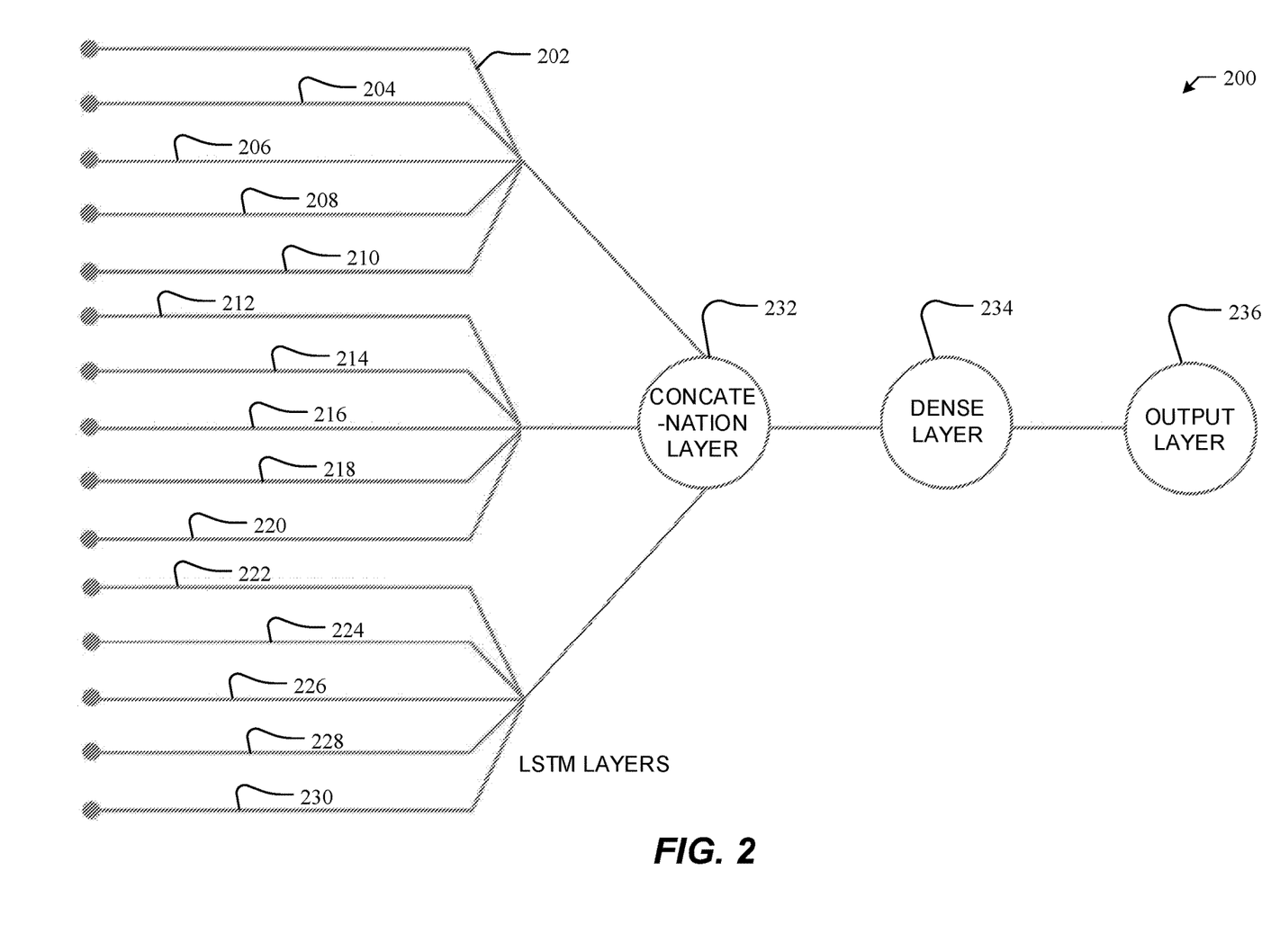
FIG. 2 illustrates a deep-learning model for predicting user demographics classifications based on user viewing content.

FIG. 2 illustrates a deep-learning model 200 for predicting user demographics classifications based on user viewing content, in accordance with the presently disclosed embodiments. In particular embodiments, the deep-learning model 200 may be provided for training, cross-validating, and testing. For example, in particular embodiments, the deep-learning model 200 may receive an N number of datasets (e.g., N arrays of time-series based ACR user viewing data 110 in 2-hour timeslots) generate an N number of LSTM layers 202, 204, 206, 208, 210, 212, 214, 216, 218, 220, 222, 224, 226, 228, and 230 based thereon. In particular embodiments, the N number of LSTM layers 202, 204, 206, 208, 210, 212, 214, 216, 218, 220, 222, 224, 226, 228, and 230 may include one or more sequence models corresponding to, for example, TV programming genres and/or TV programming subgenres (e.g., features), such as arts, cars and motors, documentaries, drama, gameshow, health, sports, sports (baseball), sports (basketball), sports (football), sports (golf), sports (hockey), sports (hunting), sports (other), sports (soccer), and/or one or more other similar programming genres and/or programming subgenres. In particular embodiments, the sports and health related programming genres and/or programming subgenres (e.g., features) may be utilized to most often distinguish between feminine and masculine genders.

In particular embodiments, outputs of the LSTM layers 202-230 of the deep-learning model 200 may be combined into a single array utilizing, for example, a concatenation layer 232. The concatenation layer 232 may then transfer the single array through one or more dense layers 234 of the deep-learning model 200 may to, for example, introduce one or more bias to the single array. In particular embodiments, from the one or more dense layers 234, the single array may be then transferred through a sigmoid output layer 236 of the deep-learning model 200. In particular embodiments, the sigmoid output layer 236 may include, for example, a number of neurons (e.g., equal to the number of classes and/or classification labels) that may be utilized to classify the single array into individual classes, in which one or more final probabilities for individual demographic classification labels may be calculated. In particular embodiments, the deep-learning model 200 may also include a loss function that may be utilized to assign a higher weight to positive classification for individual demographic classification labels, assuming that individual users and/or subgroups of users may typically not exceed more than a maximum number of users (e.g., 3 users). In particular embodiments, the loss function corresponding to the sigmoid output layer 236 may include, for example, a weighted-binary cross entropy loss function, a binary cross entropy loss function, or an FL loss function.

Figure 3:
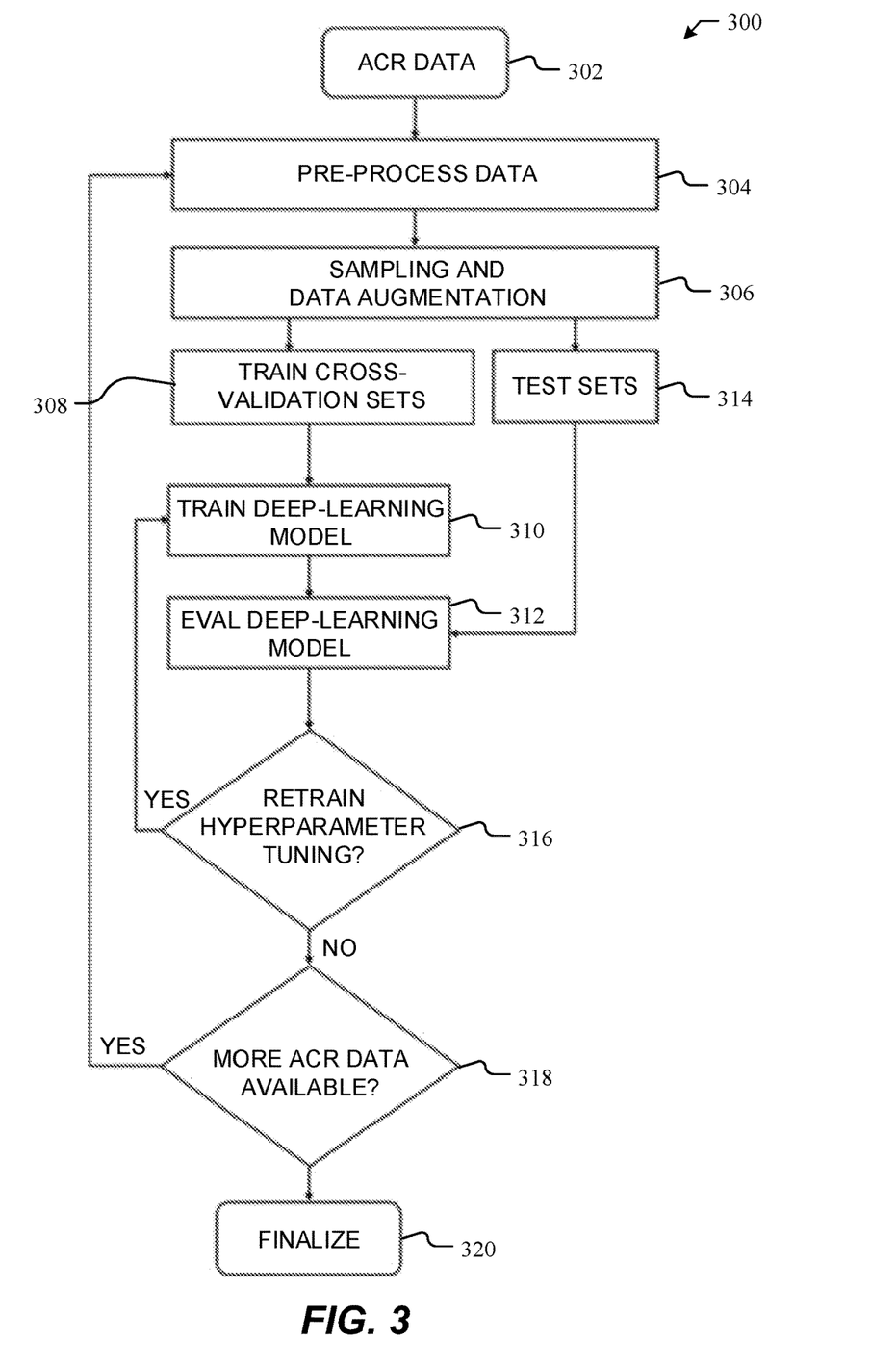
FIG. 3 illustrates a flow diagram of a method for training, cross-validating, and testing a multi-label demographics classification deep learning model.

FIG. 3 illustrates a flow diagram of a method 300 for training, cross-validating, and testing a multi-label demographics classification deep learning model, in accordance with the presently disclosed embodiments. The method 300 may be performed utilizing one or more processing devices (e.g., programming analytics system 102) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing user viewing content time-series data), software (e.g., instructions running/executing on one or more processors), firmware (e.g., microcode), or some combination thereof.

The method 300 may begin block 302 with the one or more processing devices (e.g., programming analytics system 102) receiving or accessing time-series based ACR user viewing data. The method 300 may then continue at block 304 with the one or more processing devices (e.g., programming analytics system 102) performing a series of pre-processing processed on the ACR user viewing data. The method 300 may continue at block 306 with the one or more processing devices (e.g., programming analytics system 102) performing stratified sampling and data augmentation of the time-series based ACR user viewing data. The method 300 may then continue at block 308 with the one or more processing devices (e.g., programming analytics system 102) utilizing one or more cross-validation datasets to train received datasets corresponding to the time-series based ACR user viewing data. The method 300 may then continue at block 310 with the one or more processing devices (e.g., programming analytics system 102) training the demographics classification deep learning model.

The method 300 may then continue at block 312 with the one or more processing devices (e.g., programming analytics system 102) evaluating the demographics classification deep learning model by validating deep-learning model against a number of arbitrary testing data sets at block 314. In particular embodiments, the evaluation of the demographics classification deep learning model may include measuring, for example, a precision, a recall, and an $F_1$ score of the demographics classification deep learning model and comparing these parameters to one or more threshold parameters (e.g., included as part of the test sets at block 314). In particular embodiments, the best possible demographics classification deep learning model may include one in which the precision, the recall, and the $F_1$ score are measure at their highest possible values.

The method 300 may then continue at decision 316 with the one or more processing devices (e.g., programming analytics system 102) determining whether to retrain the hyper-parameter tuning of the demographics classification deep learning model. In particular embodiments, the hyper-parameter tuning may correspond to, for example, the number of LSTM layers 202-230, and, by extension, the number of programming genres and/or subgenres (e.g., features) included in the demographics classification deep learning model. If decision 316 is "YES", the method 300 may return to block 308 to retrain the demographics classification deep learning model. If decision 316 is "NO", the method 300 then continue at decision 318 with the one or more processing devices (e.g., programming analytics system 102) determining whether more time-series based ACR user viewing data is available. If decision 318 is "YES", the method 300 may return to block 302 to perform another iteration of training, cross-validating, and testing the demographics classification deep learning model. If decision 318 is "NO", the method 300 may terminate at block 320 with a finalized multi-label demographics classification deep learning model, as generally discussed above with respect to FIGS. 1 and 2.

Figure 4:
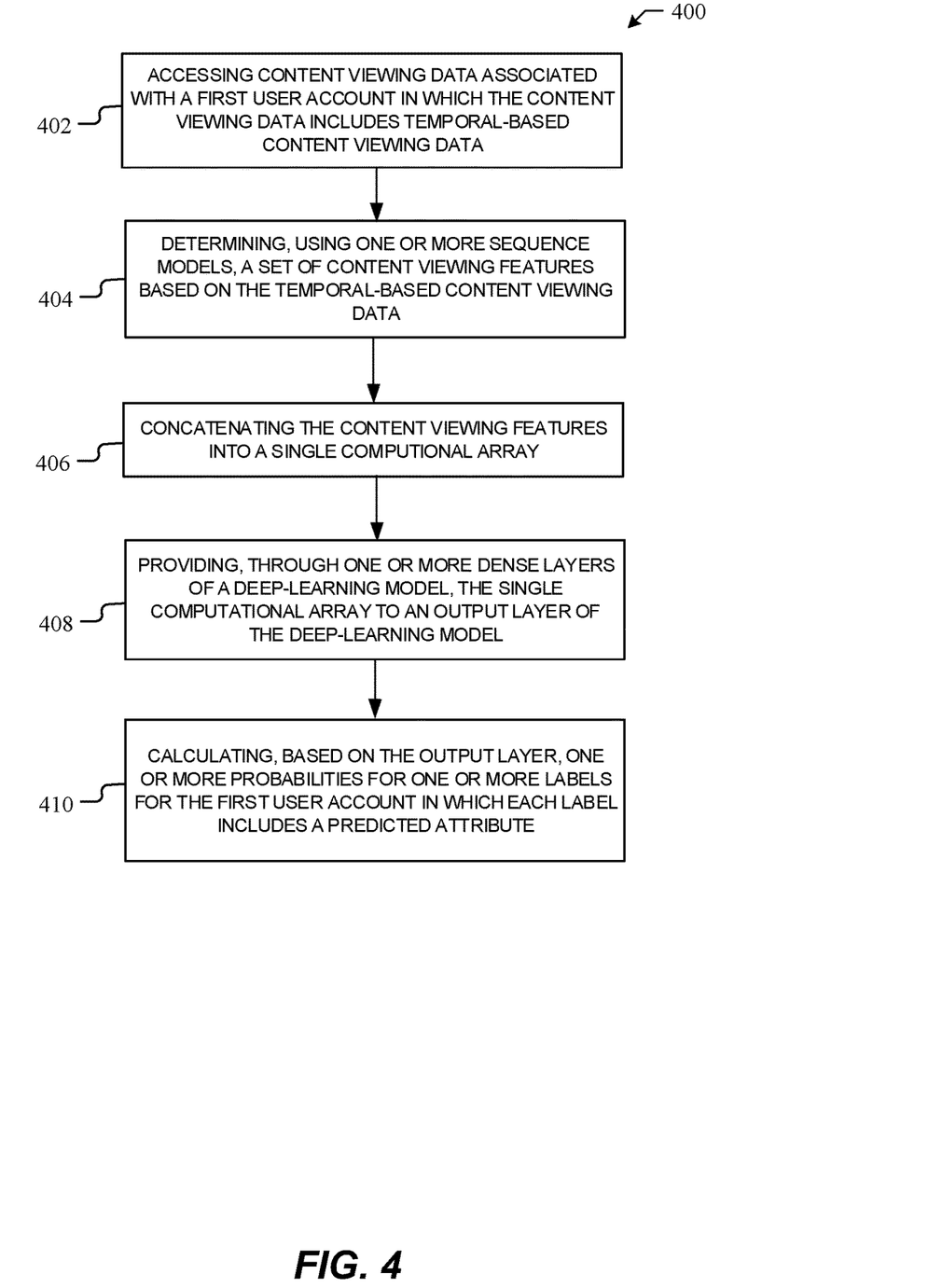
FIG. 4 illustrates a flow diagram of a method for predicting user demographics classifications based on user viewing content data.

FIG. 4 illustrates a flow diagram of a method 400 for predicting user demographics classifications based on user viewing content data, in accordance with the presently disclosed embodiments. The method 400 may be performed utilizing one or more processing devices (e.g., programming analytics system 102) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing user viewing content time-series data), software (e.g., instructions running/executing on one or more processors), firmware (e.g., microcode), or some combination thereof.

The method 400 may begin block 402 with the one or more processing devices (e.g., programming analytics system 102) accessing content viewing data associated with a first user account, in which the first user account is associated with one or more client devices and the content viewing data comprises temporal-based content viewing data. In particular embodiments, the temporal-based content viewing data may include content programming genre data. The method 400 may then continue at block 404 with the one or more processing devices (e.g., programming analytics system 102) determining, using one or more sequence models, a set of content viewing features based on the temporal-based content viewing data. In particular embodiments, the set of content viewing features may include a set of long-short-term memory (LSTM) layers each corresponding to a different one of a number of temporal-based content programming genres or temporal-based content programming subgenres. Specifically, the set of content viewing features may be determined at least in part based on the content programming genre data.

The method 400 may then continue at block 406 with the one or more processing devices (e.g., programming analytics system 102) concatenating the content viewing features into a single computational array. The method 400 may then continue at block 408 with the one or more processing devices (e.g., programming analytics system 102) providing, through one or more dense layers of a deep-learning model, the single computational array to an output layer of the deep-learning model. The method 400 may then conclude at block 410 with the one or more processing devices (e.g., programming analytics system 102) calculating, based on the output layer, one or more probabilities for one or more labels for the first user account, in which each label includes a predicted attribute for the first user account. In particular embodiments, calculating, based on the output of the output layer, one or more probabilities for the one or more labels may include calculating one or more of an N number of combinations of an M number of demographic parameters. The demographic parameters may include, for example, a number of user age groups and a number of user genders. In particular embodiments, the output layer may include a sigmoid output layer of the deep-learning model. In particular embodiments, the deep-learning model may also include a loss function, which may include, for example, a weighted-binary cross entropy loss function, a binary cross entropy loss function, or a focal loss (FL) loss function.

Indeed, in some implementations, the present embodiments of predicting user demographics classifications based on user viewing content data may provide an increasingly accurate prediction of up to 14 individual demographic classification labels corresponding to multi-label associations between user age group and user gender (e.g., F:13-17, M:13-17, F:18-24, M:18-24, F:25-34, M:25-34, F:35-44, M:35-44, F:45-54, M:45-54, F:55-64, M:55-64, F:65+, M:65+). In this way, the present embodiments may allow the programming analytics system 102 to provide both advertising content and programming content that may be better suited to, for example, the desires, preferences, and interests of individual users and/or individual subgroups of users.

Figure 5:
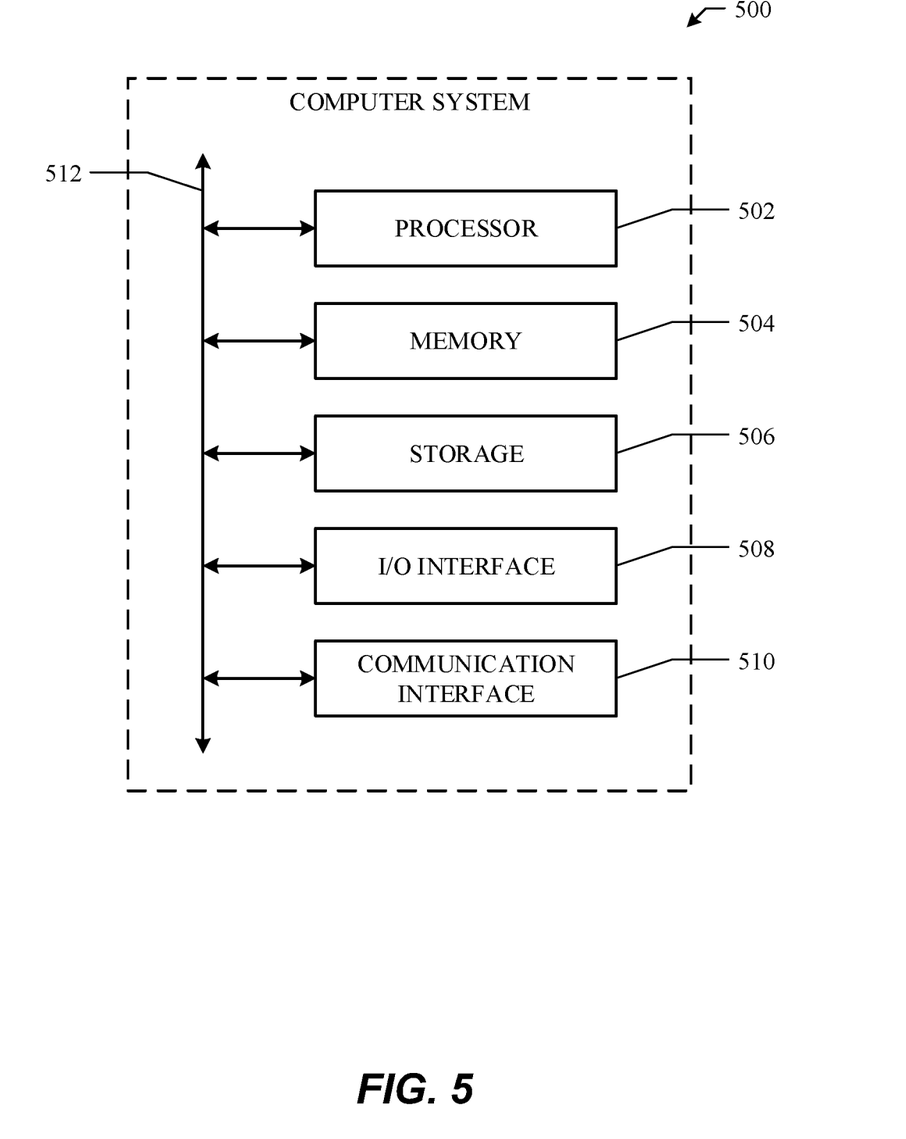
FIG. 5 illustrates an example computer system.

FIG. 5 illustrates an example computer system 500 that may be utilized for predicting user demographics classifications based on user viewing content data, in accordance with the presently disclosed embodiments. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks.

Where appropriate, one or more computer systems 500 may perform without substantial spatial or temporal limitation one or more steps of one or more methods described or illustrated herein. As an example, and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 810, and a bus 512. Although this disclosure describes and illustrates a particular computer system having a particular number of particular components in a particular arrangement, this disclosure contemplates any suitable computer system having any suitable number of any suitable components in any suitable arrangement. In particular embodiments, processor 502 includes hardware for executing instructions, such as those making up a computer program. As an example, and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example, and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502.

Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 802. Although this disclosure describes and illustrates a particular processor, this disclosure contemplates any suitable processor.

In particular embodiments, memory 504 includes main memory for storing instructions for processor 502 to execute or data for processor 502 to operate on. As an example, and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere).

One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memory devices 504, where appropriate. Although this disclosure describes and illustrates particular memory, this disclosure contemplates any suitable memory.

In particular embodiments, storage 506 includes mass storage for data or instructions. As an example, and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 506 for them. Where appropriate, I/O interface 508 may include one or more device or software drivers enabling processor 502 to drive one or more of these I/O devices. I/O interface 508 may include one or more I/O interfaces 506, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 500 and one or more other computer systems 500 or one or more networks. As an example, and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it.

As an example, and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 512 includes hardware, software, or both coupling components of computer system 500 to each other. As an example, and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Figure 6:
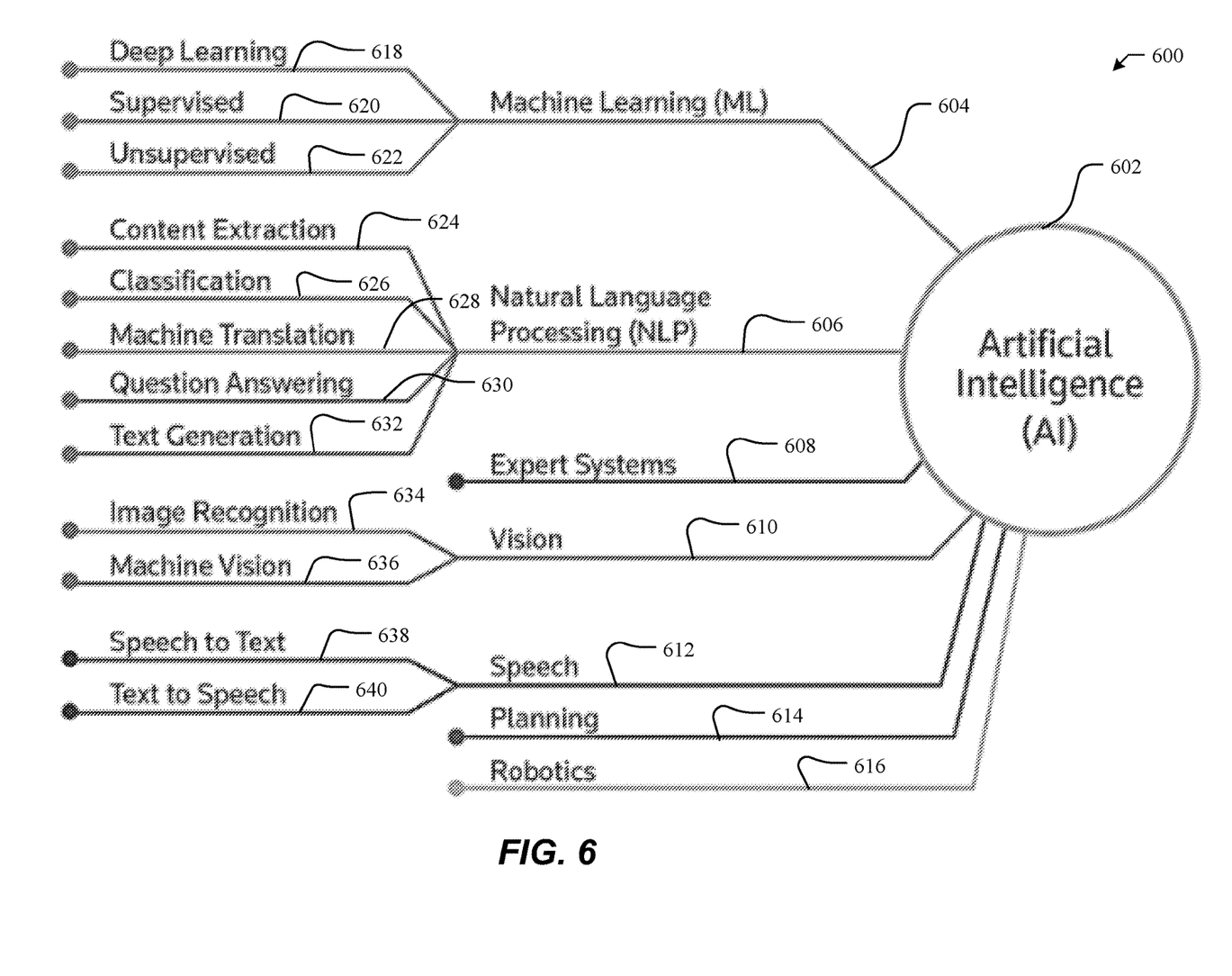
FIG. 6 illustrates a diagram of an example artificial intelligence (AI) architecture.

FIG. 6 illustrates a diagram 600 of an example artificial intelligence (AI) architecture 602 that may be utilized in predicting user demographics classifications based on user viewing content data, in accordance with the presently disclosed embodiments. In particular embodiments, the AI architecture 602 may be implemented utilizing, for example, one or more processing devices that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), and/or other processing device(s) that may be suitable for processing various data and making one or more decisions based thereon), software (e.g., instructions running/executing on one or more processing devices), firmware (e.g., microcode), or some combination thereof.

In particular embodiments, as depicted by FIG. 6, the AI architecture 602 may include machine leaning (ML) algorithms and functions 604, natural language processing (NLP) algorithms and functions 606, expert systems 608, computer-based vision algorithms and functions 610, speech recognition algorithms and functions 612, planning algorithms and functions 614, and robotics algorithms and functions 616. In particular embodiments, the ML algorithms and functions 604 may include any statistics-based algorithms that may be suitable for finding patterns across large amounts of data (e.g., "Big Data" such as user click data or other user interactions, text data, image data, video data, audio data, speech data, numbers data, and so forth). For example, in particular embodiments, the ML algorithms and functions 604 may include deep learning algorithms 618, supervised learning algorithms 620, and unsupervised learning algorithms 622.

In particular embodiments, the deep learning algorithms 618 may include any artificial neural networks (ANNs) that may be utilized to learn deep levels of representations and abstractions from large amounts of data. For example, the deep learning algorithms 618 may include ANNs, such as a multilayer perceptron (MLP), an autoencoder (AE), a convolution neural network (CNN), a recurrent neural network (RNN), long short term memory (LSTM), a grated recurrent unit (GRU), a restricted Boltzmann Machine (RBM), a deep belief network (DBN), a bidirectional recurrent deep neural network (BRDNN), a generative adversarial network (GAN), and deep Q-networks, a neural autoregressive distribution estimation (NADE), an adversarial network (AN), attentional models (AM), deep reinforcement learning, and so forth.

In particular embodiments, the supervised learning algorithms 620 may include any algorithms that may be utilized to apply, for example, what has been learned in the past to new data using labeled examples for predicting future events. For example, starting from the analysis of a known training dataset, the supervised learning algorithms 620 may produce an inferred function to make predictions about the output values. The supervised learning algorithms 620 can also compare its output with the correct and intended output and find errors in order to modify the supervised learning algorithms 620 accordingly. On the other hand, the unsupervised learning algorithms 622 may include any algorithms that may applied, for example, when the data used to train the unsupervised learning algorithms 622 are neither classified or labeled. For example, the unsupervised learning algorithms 622 may study and analyze how systems may infer a function to describe a hidden structure from unlabeled data.

In particular embodiments, the NLP algorithms and functions 606 may include any algorithms or functions that may be suitable for automatically manipulating natural language, such as speech and/or text. For example, in some embodiments, the NLP algorithms and functions 606 may include content extraction algorithms or functions 624, classification algorithms or functions 626, machine translation algorithms or functions 628, question answering (QA) algorithms or functions 630, and text generation algorithms or functions 632. In particular embodiments, the content extraction algorithms or functions 624 may include a means for extracting text or images from electronic documents (e.g., webpages, text editor documents, and so forth) to be utilized, for example, in other applications.

In particular embodiments, the classification algorithms or functions 626 may include any algorithms that may utilize a supervised learning model (e.g., logistic regression, naïve Bayes, stochastic gradient descent (SGD), k-nearest neighbors, decision trees, random forests, support vector machine (SVM), and so forth) to learn from the data input to the supervised learning model and to make new observations or classifications based thereon. The machine translation algorithms or functions 628 may include any algorithms or functions that may be suitable for automatically converting source text in one language, for example, into text in another language. The QA algorithms or functions 630 may include any algorithms or functions that may be suitable for automatically answering questions posed by humans in, for example, a natural language, such as that performed by voice-controlled personal assistant devices. The text generation algorithms or functions 632 may include any algorithms or functions that may be suitable for automatically generating natural language texts.

In particular embodiments, the expert systems 608 may include any algorithms or functions that may be suitable for simulating the judgment and behavior of a human or an organization that has expert knowledge and experience in a particular field (e.g., stock trading, medicine, sports statistics, and so forth). The computer-based vision algorithms and functions 610 may include any algorithms or functions that may be suitable for automatically extracting information from images (e.g., photo images, video images). For example, the computer-based vision algorithms and functions 610 may include image recognition algorithms 634 and machine vision algorithms 636. The image recognition algorithms 634 may include any algorithms that may be suitable for automatically identifying and/or classifying objects, places, people, and so forth that may be included in, for example, one or more image frames or other displayed data. The machine vision algorithms 636 may include any algorithms that may be suitable for allowing computers to "see", or, for example, to rely on image sensors cameras with specialized optics to acquire images for processing, analyzing, and/or measuring various data characteristics for decision making purposes.

In particular embodiments, the speech recognition algorithms and functions 612 may include any algorithms or functions that may be suitable for recognizing and translating spoken language into text, such as through automatic speech recognition (ASR), computer speech recognition, speech-to-text (STT), or text-to-speech (TTS) in order for the computing to communicate via speech with one or more users, for example. In particular embodiments, the planning algorithms and functions 614 may include any algorithms or functions that may be suitable for generating a sequence of actions, in which each action may include its own set of preconditions to be satisfied before performing the action. Examples of AI planning may include classical planning, reduction to other problems, temporal planning, probabilistic planning, preference-based planning, conditional planning, and so forth. Lastly, the robotics algorithms and functions 616 may include any algorithms, functions, or systems that may enable one or more devices to replicate human behavior through, for example, motions, gestures, performance tasks, decision-making, emotions, and so forth.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The embodiments disclosed herein are only examples, and the scope of this disclosure is not limited to them. Embodiments according to this disclosure are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing systems:
   accessing content viewing data associated with a first user account, wherein the first user account is associated with one or more client devices, and wherein the content viewing data comprises temporal-based content viewing data;
   determining, based on the content viewing data, N arrays of time-series based user viewing data;
   generating N number of LSTM layers of a deep-learning model;
   processing, by each one of the N LSTM layers, a different one of the N arrays of time-series based user viewing data by executing one or more sequence models of each of the N LSTM layers to determine a set of content viewing features based at least in part on the different one of the N array of time-series based user viewing data;

concatenating the content viewing features determined using the one or more sequence models of each of the N LSTM layers into a single computational array;

providing, using one or more dense layers of the deep-learning model, the single computational array to an output layer of the deep-learning model; and calculating, based on the output layer, one or more probabilities for one or more labels for the first user account, wherein each label comprises a predicted attribute for the first user account.

2. The method of claim 1, wherein calculating, based on the output of the output layer, one or more probabilities for the one or more labels comprises calculating one or more of an N number of combinations of an M number of demographic parameters.

3. The method of claim 2, wherein the demographic parameters comprise a plurality of user age groups and a plurality of user genders.

4. The method of claim 1, wherein the temporal-based content viewing data comprises content programming genre data, and wherein the set of content viewing features is determined at least in part based on the content programming genre data.

5. The method of claim 1, wherein the deep learning model includes a loss function, and wherein the loss function comprises a weighted-binary cross entropy loss function, a binary cross entropy loss function, or a focal loss (FL) loss function.

6. The method of claim 1, wherein the set of content viewing features comprises a set of long-short-term memory (LSTM) layers each corresponding to a different one of a plurality of temporal-based content programming genres or temporal-based content programming subgenres.

7. The method of claim 1, wherein the output layer comprises a sigmoid output layer of the deep-learning model.

8. A system comprising: one or more non-transitory computer-readable storage media including instructions; and one or more processors coupled to the storage media, the one or more processors configured to execute the instructions to:

access content viewing data associated with a first user account, wherein the first user account is associated with one or more client devices, and wherein the content viewing data comprises temporal-based content viewing data;

determine, based on the content viewing data, N arrays of time-series based user viewing data;

generate N number of LSTM layers of a deep-learning model;

process, by each one of the N LSTM layers, a different one of the N arrays of time-series based user viewing data by executing one or more sequence models of each of the N LSTM layers to determine a set of content viewing features based at least in part on the different one of the N array of time-series based user viewing data;

concatenate the content viewing features determined using the one or more sequence models of each of the N LSTM layers into a single computational array;

provide, using one or more dense layers of the deep-learning model, the single computational array to an output layer of the deep-learning model; and calculate, based on the output layer, one or more probabilities for one or more labels for the first user account, wherein each label comprises a predicted attribute for the first user account.

9. The system of claim 8, wherein the one or more processors are further configured to execute the instructions to calculate one or more of an N number of combinations of an M number of demographic parameters, as the one or more labels for the first user account.

10. The system of claim 9, wherein the demographic parameters comprise a plurality of user age groups and a plurality of user genders.

11. The system of claim 8, wherein the temporal-based content viewing data comprises content programming genre data, and wherein the set of content viewing features is determined at least in part based on the content programming genre data.

12. The system of claim 8, wherein the deep learning model comprises a loss function, and wherein the loss function comprises a weighted-binary cross entropy loss function, a binary cross entropy loss function, or a focal loss (FL) loss function.

13. The system of claim 8, wherein the set of content viewing features comprises a set of long-short-term memory (LSTM) layers each corresponding to a different one of a plurality of temporal-based content programming genres or temporal-based content programming subgenres.

14. The system of claim 8, wherein the output layer comprises a sigmoid output layer of the deep-learning model.

15. A non-transitory computer-readable medium comprising instructions that, when executed by one or more processors of a computing system, cause the one or more processors to:

access content viewing data associated with a first user account, wherein the first user account is associated with one or more client devices, and wherein the content viewing data comprises temporal-based content viewing data;

determine, based on the content viewing data, N arrays of time-series based user viewing data;

generate N number of LSTM layers of a deep-learning model;

process, by each one of the N LSTM layers, a different one of the N arrays of time-series based user viewing data by executing one or more sequence models of each of the N LSTM layers to determine a set of content viewing features based at least in part on the different one of the N array of time-series based user viewing data;

concatenate the content viewing features determined using the one or more sequence models of each of the N LSTM layers into a single computational array;

provide, using one or more dense layers of the deep-learning model, the single computational array to an output layer of the deep-learning model; and calculate, based on the output layer, one or more probabilities for one or more labels for the first user account, wherein each label comprises a predicted attribute for the first user account.

16. The non-transitory computer-readable medium of claim 15, wherein the instructions further cause the one or more processors to calculate one or more of an N number of combinations of an M number of demographic parameters, as the one or more labels for the first user account.

17. The non-transitory computer-readable medium of claim 16, wherein the demographic parameters comprise a plurality of user age groups and a plurality of user genders.

18. The non-transitory computer-readable medium of claim 15, wherein the temporal-based content viewing data comprises content programming genre data, and wherein the set of content viewing features is determined at least in part based on the content programming genre data.

19. The non-transitory computer-readable medium of claim 15, wherein the set of content viewing features comprises a set of long-short-term memory (LSTM) layers each corresponding to a different one of a plurality of temporal-based content programming genres or temporal-based content programming subgenres.

20. The non-transitory computer-readable medium of claim 15, wherein the output layer comprises a sigmoid output layer of the deep-learning model.

* * * * *